April 8, 1969     R. B. DOWNEY ET AL     3,437,024

CAMERA APPARATUS

Filed Dec. 22, 1966     Sheet 1 of 3

INVENTORS
Rogers B. Downey
and
Allyn M. Silverman

Brown and Mikulka
ATTORNEYS

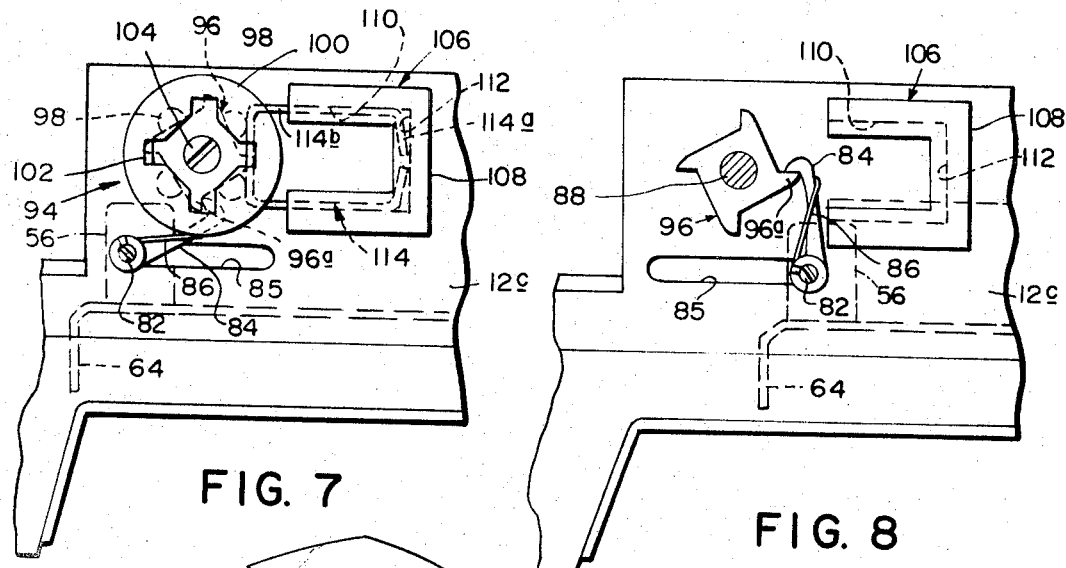
FIG. 7
FIG. 8
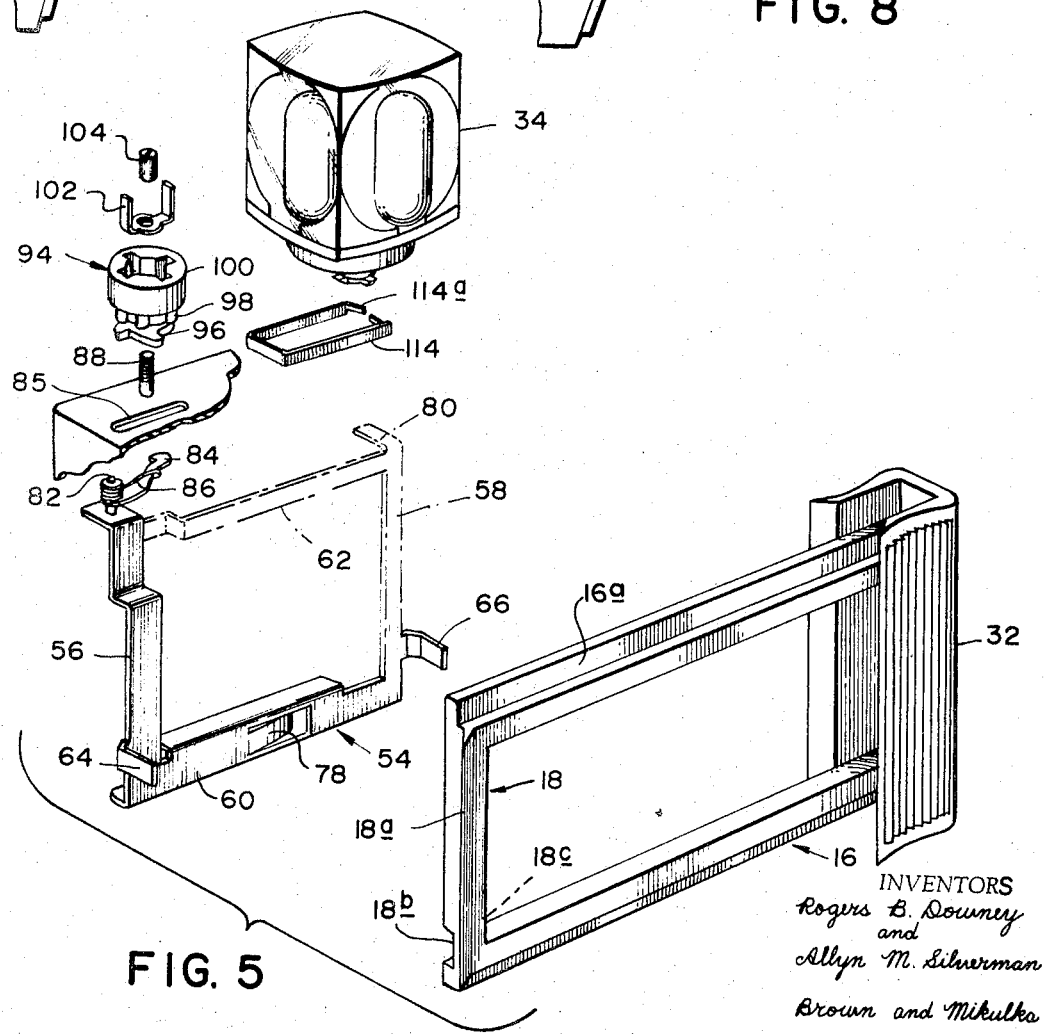
FIG. 5

United States Patent Office 3,437,024
Patented Apr. 8, 1969

3,437,024
CAMERA APPARATUS
Rogers B. Downey, Lexington, and Allyn M. Silverman, Boston, Mass., assignors to Polaroid Corporation, Cambridge, Mass., a corporation of Delaware
Filed Dec. 22, 1966, Ser. No. 604,051
Int. Cl. G03b 17/50
U.S. Cl. 95—13        7 Claims

ABSTRACT OF THE DISCLOSURE

A camera including apparatus for exposing and processing self-developing film assemblies carried in a magazine. The exposure functions performed by the apparatus include those relating to the cocking of a shutter and operation of a film counter and, more particularly, that providing rotation of a flash cube.

---

A film assembly of a type suitable for use with the apparatus of the present invention includes photosensitive and image-providing components and a releasably-contained processing liquid. It is of a multilayer structure such that after exposure, release of the liquid by the application of a compressive force, as by a pair of pressure rolls, to a liquid-containing element of the assembly, spreading of the liquid and imbition thereof into predetermined layers, including an exposed silver-halide emulsion layer, provide a visible image. The image is formed by the diffusion transfer of image-forming substances to a designated image-receiving surface. Such a process is associated with cameras and film materials sold by Polaroid Corporation, Cambridge, Mass., U.S.A. Processing is initiated by moving the film assembly between compressive means and involves mechanical transport means operating according to a predetermined program. A processing liquid suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming agent such as a synthetic polymer of the type of sodium carboxymethyl cellulose and, possibly, a high-molecular-weight polymeric mordant to facilitate the transfer process. In producing a black-and-white image, a latent image is developed; the exposed silver halide is reduced to silver, and the unreduced silver halide forms a soluble silver complex which is transferred from developed areas to tthe image-receiving surface, the image being formed on the latter in silver. In the production of a color transparency, substances capable of forming dye images at the image-receiving surface such as dyes, color couplers, or the like, may be employed in the transfer process. Or, a black-and-white image in conjunction with a color screen may, advantageously, be employed to provide an image visible substantially in full color.

Cameras of a generally related category adapted to process film materials of the type above described, of a miniature format, are set forth in U.S. Patent 3,225,670 and in the copending patent applications Ser. No. 448,630 filed Apr. 16, 1965, under the names of Patrick L. Finelli and Herbert A. Bing for Camera Apparatus and, more particularly, Ser. No. 516,416 filed Dec. 27, 1965, under the name of Rogers B. Downey for Camera Apparatus. In the aforesaid cameras, the processing mechanism performs only the function of advancing and compressing each film assembly to effect its processing. The apparatus of the present invention enables, in addition thereto, the performance of certain functions principally relating to the exposure of the film assembly. These comprise the operation of a so-called "flash-cube" and may, for example, also include the tensioning of a shutter actuating means and the operation of a film counter.

Objects of the invention, accordingly, are to provide photographic apparatus incorporated with a camera to effect certain operations associated with the exposure of a film assembly within the camera; to provide apparatus of the character described wherein the camera is of a type comprising means for processing the film assembly and wherein the apparatus includes means interlocking with the processing means to effect the aforesaid exposure operations; to provide apparatus, as defined, which is responsive to an inward and outward linear movement of a manually-actuated element mounted within the camera, which movement provides all of the above-described functions; and to provide apparatus of the category stated which is simple and rugged in structure and positive in action.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein:

FIG. 5 is a diagrammatic exploded view of the apparatus;

FIGS. 7 and 8 are diagrammatic plan views of components of the apparatus for providing a stepwise rotation of a flash-cube mounted thereon.

Figure 1:
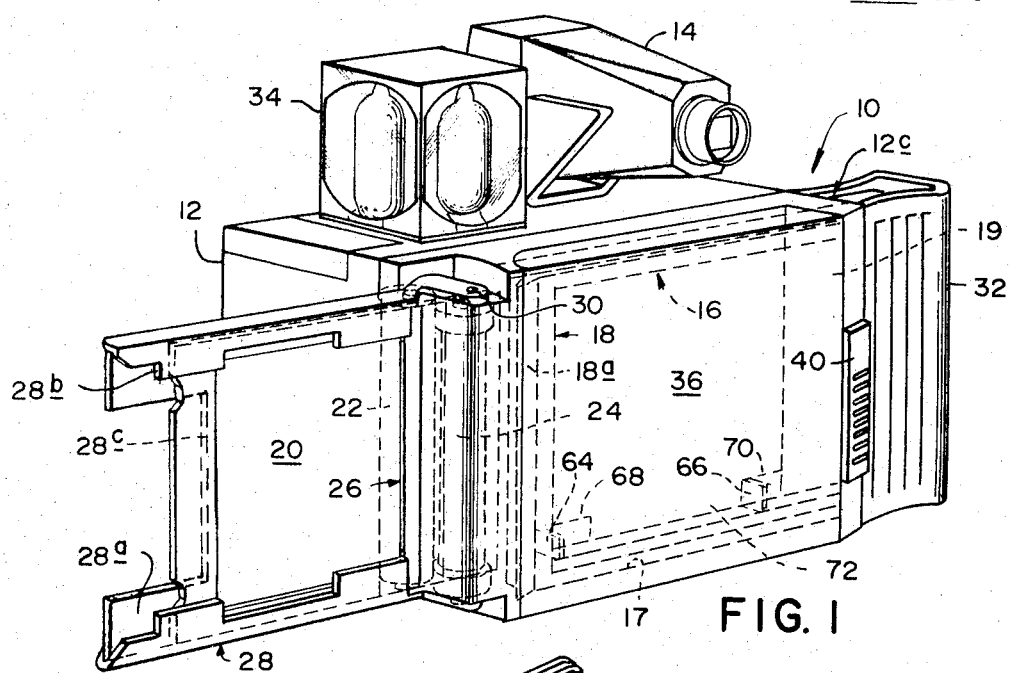
FIGURE 1 is a diagrammatic rear view of a miniature camera embodying apparatus of the present invention.
Figure 6:
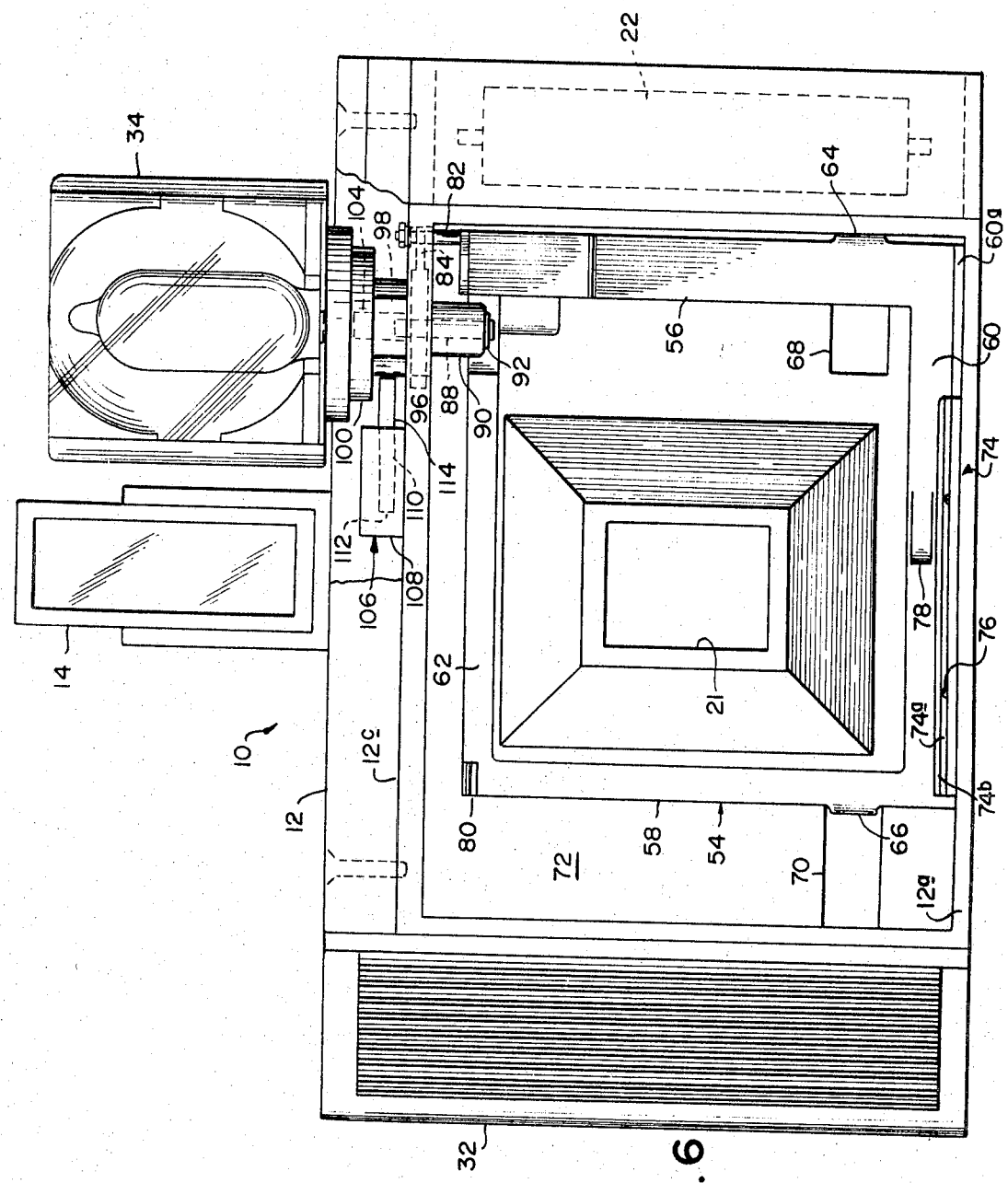
FIG. 6 is a diagrammatic front view of the camera, with parts broken away.

Referring now to the drawings, a miniature camera 10 incorporating the apparatus of the present invention is shown from the rear in FIG. 1 and from the front, with portions including front and upper walls broken away in FIG. 6. It is to be assumed that a lens, shutter and diaphragm assembly is mounted on the front wall, but not shown as it constitutes no part of the invention. The camera comprises a housing 12 composed of a metal such as aluminum or a suitable plastic, a viewfinder 14 and certain elements specifically identified with the processing of a film assembly of the general character previously described. More particularly, the film assembly is of a type which, after its processing, assumes the form of a fully-mounted transparency or slide, ready for direct viewing or projection, when it is removed from the camera. A plastic material appropriate for forming the camera housing may, for example, be that known as "Delrin," sold by E. I. du Pont de Nemours Co., Wilmington, Delaware. Another plastic suitable for the purpose is "Acryafil," sold by Fiberfil, Inc., Evansville, Ind., U.S.A.

The processing elements essentially include a frame-like, "pusher-type" film assembly advancing means 16 mounted for slidable linear movement and having a transverse leading bar component 18 for contacting the trailing edge 20a of each film assembly 20 and propelling the latter after its exposure from the focal plane of the camera aligned with the lens aperture thereof at 21 between a pair of pressure rolls 22 and 24, through an exit aperture or slot at 26 formed in the camera housing, and into a semi-enclosing processing chamber 28. The processing chamber is pivotally mounted at 30 and folds rearwardly against the back of the camera when not in use. The film-advancing means 16 is manually actuated by a handle 32 affixed to an end thereof which extends through one end of the camera housing opposite to that identified with the exit slot 26. A standard flash-cube unit 34, including the usual flash-bulb, reflector and protective cover, is shown mounted on the camera, its rotation in steps of 90° accompanying actuation of the film-advancing means 16.

A plurality of the film assemblies 20, in the form of a film pack, is contained in a magazine 36. They are impelled forwardly or toward the substantially open face 36a of the magazine by suitable biasing means within the magazine not shown. Each foremost film assembly 20c of the film pack, that is, the film assembly nearest the open face of the magazine, is adapted to be slidably removed from the magazine along the guide flanges or channels 38. The magazine 36, containing the film pack, is releasably mounted on the back of the camera to then constitute an integral part thereof, the latch being subject to release by actuation of the slidable button 40. With the magazine thus mounted, as shown in FIG. 1, it is to be understood that the foremost film assembly 20c prior to its advancement, is positioned at the focal plane of the camera, in readiness for a photographic exposure. Thereafter, the film assembly is adapted to be slidably advanced by the "pusher-type" means 16 in the manner above described.

Figure 2:
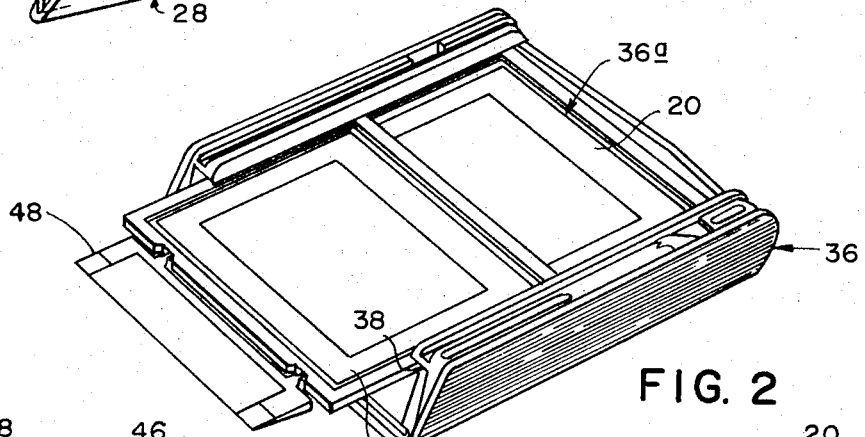
FIG. 2 is a diagrammatic perspective of a magazine and film pack employed in conjunction with apparatus of the invention.
Figure 3:
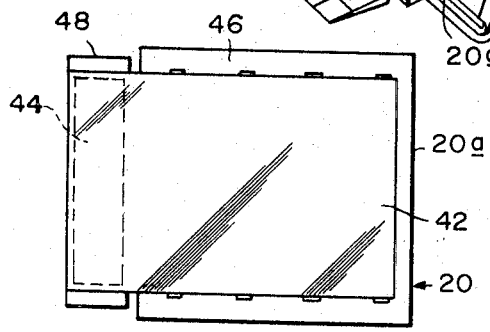
FIGS. 3 and 4 are diagrammatic rear and front views, respectively, of a film assembly used in conjunction with the apparatus of the invention.
Figure 4:
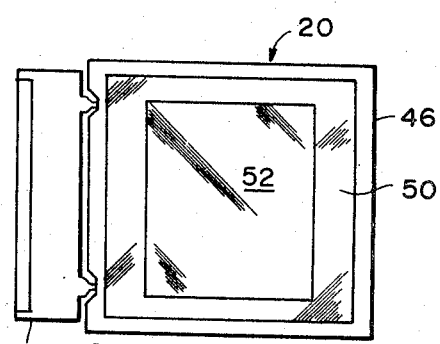

The film assembly 20 is shown from the front in FIGS. 2 and 4 and from the rear in FIG. 3. The terms "front" and "rear" or their equivalents, as used herein, refer to the relative proximity or remoteness of the parts or elements mentioned to the front of the camera, as or when associated therewith. When advanced through the slot at 26, the open front of the film assembly, through which light of the photographic exposure has entered, is positioned against the opaque surface or base 28a of the processing chamber and thus is protected against the incidence of damaging ambient light during the final seconds of the processing operation. Its rear surface is protected by a cover sheet 42 which, after processing has been completed, is manually removed. The film assembly also includes a processing liquid releasably-confined in a compressible container 44, a rigid or semi-rigid plastic mount 46 including a separable "break-off" tab 48, a masking or framing element 50 and a composite film component 52 which includes therewithin a photosensitive silver-halide emulsion, means providing an image-receiving layer and such other components, previously described, as may be required to produce by diffusion transfer the completed transparency. When the film asembly 20 is advanced between the presure rolls 22 and 24, the processing liquid is released and spread at least throughout the emulsion. After remaining in the processing chamber 28 for a period of a few seconds, held by the retaining flanges 28b, the liquid permeates into the emulsion, diffusion transfer of image-forming substances to the internal image-receiving layer occurs, and the photographic image in black-and-white or in full color, depending upon the image-producing photographic characteristics of the film component 52, is produced at the image-receiving layer. The separable tab 48 is then manually grasped and broken off, the exhausted container 44, emulsion layer of the film component 52, and the cover sheet 42 are stripped away therewith as a unit. The finished mounted transparency remains in the chamber 28, held by the flanges 28b, as shown in FIG. 1. It can easily be removed by grasping it, as facilitated by the cut-away portion 28c of the chamber.

The film-advancing means 16 is mounted for slidable linear movement in the camera, its longitudinal flanged elements 16a being inserted within channeled portions 17 of the camera for the purpose. The etxent of its travel in a direction toward the pressure rolls 22 and 24 is limited by contact of the handle 32 with the exterior of the camera housing at 12c. Its movement is an opposite direction is limited by contact of the cross-bar 18 with an inner wall or partition 19 of the camera. The cross-bar 18, and more particularly the angularly-projecting portion 18a thereof, serves to propel each film assembly from the focal plane to the pressure rolls 22 and 24 and thence to the processing chamber 28. Additionally, the film-advancing means 16 embodies two functional surface portions 18b and 18c for actuating a rectangular intermediate driving or actuating element 54 interlocking with other mechanism of the camera, to be described. The element 54 is formed from a sheet metal and is composed of a plurality of integral arms and angularly-projecting lugs or tangs. As shown in FIGS. 5 and 6, it comprises the vertically-disposed arm members 56 and 58 and the longitudinal or horizontal interconnecting arm members 60 and 62. The arms 56 and 58 include, respectively, the rearwardly projecting tangs 64 and 66 which are subject to contact by the surface portions 18b and 18c of the cross-member or bar 18 and serve therewith to provide movement of the element 54 in accordance with movement of the film-advancing means 16. A pair of elongated slots 68 and 70 is formed within an internal web 72 of the camera. The tangs 64 and 66 protrude rearwardly through, and are permitted freedom of longitudinal movement within these slots.

The intermediate driving element 54 is mounted for slidable linear movement back-and-forth in the camera in accordance with similar movement of the film-advancing means 16, but in much shorter strokes because contact with one of the tangs occurs nearly at the end of travel of the film-advancing means 16 in either direction. Assuming the camera to be positioned as shown in FIGS. 1 and 6, horizontal linear movement of the driving element 54 is guided by a flange-like member 60a, integral with and extending forwardly at 90° from the member 60, which is slidably engaged by a guide plate 74, having a raised or channeled portion 74a formed therein and an upturned edge portion 74b. The plate 74 is fastened by retaining screws or rivets 76 to the lower wall 12a of the camera housing. The flange-like member 60a is adapted to undergo a controlled slidable movement within the indented or channeled portion 74a while the upturned portion 74b bears slidably against the front surface of the arm 60. The rear surfaces of the arm members 56, 58, 60 and 62 are in slidable contact with the web 72, the latter preferably being composed of a plastic such as that previously mentioned in conjunction with the camera housing. This contributes to a positive seating of the driving element 54 and takes advantage of the slidable property of a metal in contact with a plastic of the type mentioned.

The intermediate driving element 54, when moved by the film-advancing means 16 in the manner above described, directly actuates elements of the camera relating to the photographic exposure of the film assemblies 20. This is accomplished through the instrumentality of the forwardly-disposed tangs 78 and 80 and the arm 56 of the driving element. The tang 78 is adapted to engage actuating means of a shutter-tensioning or cocking mechanism, not shown. The tang 80 is adapted to contact and operate a film counter having a movable responsive element, also not shown. The arm 56, through the medium of a fixed pin or shaft 82 at its extremity, initiates a series of operations which provide rotation of the standard flash-cube 34 in steps or quadrants of 90°. As an acompaniment of the aforesaid operations, each of the four flash-bulbs of the flash-cube unit is brought into operative position during the advancement of a film assembly between the pressure rolls 22 and 24. Electrical energization of each flash-bulb will be understood as occurring through the closing of shutter contacts in a conventional manner and forms no part of the present invention.

The flash-cube operating mechanism will now be described in detail. Its several components are shown in the exploded view of FIG. 5 and include, in addition to the previously-described cooperating components of the driving element 54, a reciprocating pawl 84 mounted on the shaft 82, adapted to move back-and-forth freely in a slot 85 formed in an upper wall or web 12c of the camera and biased in a counterclockwise direction, as shown, by a torsion spring 86; a shaft 88 having a threaded upper extremity mounted for rotation in bearing means 90 and retained therein by lockwasher 92; a socket element 94 including at lower portions a modified ratchet-wheel 96, positioning pillar means 98 for establishing or insuring a given rotational position of the element, and a socket portion 100 for accepting the standard flash-cube 34. The socket element 94 is held fixedly on flange or spacer means of the shaft 88 by the washer 102 and internally threaded circular nut 104. A detent assembly 106, includes a mounting block 108 having two longitudinal channels 110 and a transverse interconnecting channel 112 formed therein, and a rectangular detent element 114 terminating at one end in split, angularly-extending, resilient extremities or end-pieces 114a which, in effect, constitute a spring. The element 114 is slidably mounted in the channels of block 108 whereby the continuous leading transverse end 114b thereof bears yieldingly against successive pairs of the pillars 98 during rotation of the socket element 94. In so doing, the detent element performs two functions, namely, that of establishing the socket element 94 exactly at given rotational positions, 90° apart, and preventing a reversal of its rotation during translational movement of the pawl 84, that is, during its travel in contact with the ratchet-wheel 96 prior to engaging a given tooth thereof.

Operation of the above-described interlocking apparatus for tensioning the shutter, actuating a film counter, rotating the flash-cube, and processing each exposed film assembly, constituting, for example, one complete operational cycle, will now be considered. All of the foregoing procedures are performed by manually pulling the handle 32 to its outer limit, followed by pushing it to its inner limit, the latter position being that illustrated in FIGS. 1 and 6 and providing he condition of the flash-cube rotating mechanism shown in FIG. 7.

Let it initially be assumed that the condition is one for picture-taking, namely, that the handle 32 is at its maximum inward position; that magazine 36 containing a full complement of the film assemblies 20 is mounted on the camera, as shown in FIG. 1; that a flash-bulb is positioned forwardly; and that all is in readiness for performing a photographic exposure. This places the foremost film assembly at the focal plane, an opaque cover sheet having first been removed from the film pack by operating the handle 32 through a complete "out"-and-"in" cycle to thus position the film assembly and tension the shutter. The photographic exposure is then completed in the usual manner, the finder 14 and, for example, conventional diaphragm, shutter-release and distance-adjusting means of the camera, not shown, having been utilized for the purpose.

When the handle 32 is pulled outwardly, to the right as shown in FIG. 1, or to the left as shown in FIG. 6, the film-assembly advancing means 16 is moved toward a location for engaging the trailing edge 20a of the mount of the foremost exposed film assembly. After the advancing means 16 has proceeded through a major portion of its outward travel, the surface 18c of the cross-bar 18 contacts the tang 64 of the rectangular driving element 54. From this point on, continued outward travel of the handle 32 and similar movement of the advancing means 16 produces an identical movement of the driving element 54 with the following results. The tang 78 contacts and actuates shutter-tensioning means, not shown. The pin 98 moves along the slot 85 until, when the handle 32 is at its extreme outward position, the pawl 84, biased by the torsion spring 86, is enabled to engage a given tooth 96a of the ratchet-wheel 96, the contacted booth surface extending radially and parallel to the slot 85, as shown in FIG. 8. The exact rotational position of the socket element 94 and, accordingly, of the tooth 96a is established by the detent component 114 in contact with a given pair of the positioning pillar elements 98, as above stated. Concurrently with certain of the aforesaid operations, when the handle 32 has been thus drawn to its maximum outward location, the surface 18a of the film-advancing means 16 has been brought against the trailing edge 20a of the rigid mount of the foremost film assembly which has been exposed at the focal plane, as previously intimated.

The handle 32 is now thrust inwardly, as evenly as possible, to obtain satisfactory processing of the film assembly. The cross-bar surface 18a pushes the foremost film assembly between the pressure rolls 22 and 24, through the slot at 26, and into the processing chamber 28. A succeeding film assembly is fed forwardly from the magazine 36 by biasing means of the latter and is positioned at the focal plane. The tang 80 actuates the film counter. The cross-bar surface 18b contacts the tang 64 thus advancing the drive element 54. The shutter-tensioning tang 78 returns to its initial position. The arm 56 and pin 82 return to their positions of FIG. 6, that is, they move from their positions of FIG. 8 to those of FIG. 7. Accordingly, the pawl 84, biased in a counter-clockwise direction by the torsion spring 86, moves to the left, as shown, along the slot 85 thus actuating the ratchet component 96, the integral socket 100 and the flash-cube 34 mounted in the latter to rotate in a clockwise direction through 90°, as positively insured by the detent element 106.

It will be understood that instead of the flash-cube shown, a flash unit mounting a smaller or a larger number of flash-bulbs could be employed by modifying the rotational mechanism therefor. Thus, for example, assuming a larger quantity of flash-bulbs, e.g., eight, the number of ratchet-wheel teeth would be doubled; the travel of pin 82 and pawl 84 would be approximately halved; and the positioning surfaces against which the detent 114 bears would be increased to eight, that is, an octagonal portion would supplant the pillar structure shown.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for incorporation with a camera for performing at least one function relating to the photographic exposure of a film assembly of a type embodying a processing substance and carried in said camera and at least another function relating to the processing of said film assembly by a diffusion transfer method following its exposure, said apparatus comprising compressive means, a processing chamber, a linearly-movable, rectangular, frame-like, film-advancing element slidably mounted in guide means within said camera and extending externally through one end thereof with a manually-actuable handle fastened to its extremity, said film-advancing element including a first projecting surface identified with said processing for engaging said film assembly to advance it from a focal plane between said compressive means and into said processing chamber and a pair of contacting surfaces for initiating said exposure function through movement of said film-advancing element, and linearly-movable intermediate driving means including a plurality of unitary arm and angularly-projecting tang members, a pair of which tang members is adapted to be engaged by said contacting surfaces of said film-advancing element, said driving means serving to interlock said film-advancing element with at least one movable element identified with said photographic exposure whereby both said exposure and processing functions are performed through movement of said handle.

2. Photographic apparatus, as defined in claim 1, wherein said film-advancing element is adapted to undergo linear movement back-and-forth within said guide means, as actuated by said handle and as determined by limit-stop means, a complete back-and-forth movement constituting one complete cycle of said exposure and processing functions.

3. Photographic apparatus, as defined in claim 2, wherein said intermediate driving means is a rectangularly-shaped metallic element mounted in guide means for slidable movement in the directions of said film-advancing element but in predeterminedly shorter strokes.

4. Photographic apparatus, as defined in claim 2, wherein said exposure function relates to means for rotating a flash-bulb mounting element.

5. Photographic apparatus, as defined in claim 4, wherein said rotating means comprises a ratchet-wheel incorporated with said mounting element, a reciprocating pawl, means for translationally moving said pawl, and detent means for insuring the rotational position of said mounting element.

6. Photographic apparatus, as defined in claim 1, wherein said camera is a miniature camera and said film assembly is of a miniature type adapted to produce a transparency including a substantially rigid slide mount, said projecting surface extending linearly transversely across said film-advancing element and being adapted to bear against a trailing edge of said slide mount.

7. Camera apparatus for performing a plurality of functions relating both to the photographic exposure and processing of a film assembly carried by said camera, said apparatus comprising a generally-rectangular housing, compressive means, a processing chamber, a magazine releasably attached to the back of said camera holding a plurality of said film assemblies and biasing each foremost film assembly toward a focal plane, channel means extending longitudinally of said camera between said focal plane and the camera front, a rectangular frame-like element slidably mounted for longitudinal movement in said channel means, said element including, respectively, an actuating handle located externally of said housing, a first angularly projecting surface means for engaging the trailing edge of said foremost film assembly when at said focal plane and propelling it between said compressive means and into said processing chamber, and a pair of tranversely extending surface means for engaging a first pair of projecting tangs extending substantially at 90° thereto from, and providing movement of, an interlocking frame-like longitudinally slidable element which, in turn, serves through a second pair of tangs projecting therefrom to actuate movable complentary means of the camera for performing said photographic exposure functions.

References Cited
UNITED STATES PATENTS 3,354,300    11/1967    Parsons et al. _____ 240—1.3
3,369,469    2/1968    Downey _____ 95—13

NORTON ANSHER, *Primary Examiner.*

C. B. FUNK, *Assistant Examiner.*

U.S. Cl. X.R.

240—1.3